(12) United States Patent
Morikawa et al.

(10) Patent No.: US 12,570,143 B2
(45) Date of Patent: Mar. 10, 2026

(54) CONTROL APPARATUS FOR VEHICLE

(71) Applicant: HONDA MOTOR CO., LTD., Tokyo (JP)

(72) Inventors: Masaki Morikawa, Tokyo (JP); Kazuya Sakurai, Tokyo (JP); Noriaki Suzuki, Tokyo (JP); Natsuki Ito, Tochigi (JP)

(73) Assignee: HONDA MOTOR CO., LTD, Tokyo (JP)

( * ) Notice: Subject to any disclaimer, the term of this patent is extended or adjusted under 35 U.S.C. 154(b) by 120 days.

(21) Appl. No.: 18/590,968

(22) Filed: Feb. 29, 2024

(65) Prior Publication Data

US 2024/0326586 A1     Oct. 3, 2024

(30) Foreign Application Priority Data

Mar. 31, 2023   (CN) .......................... 202310336708.3

(51) Int. Cl.
 B60K 23/06          (2006.01)
 B60L 7/26           (2006.01)
              (Continued)

(52) U.S. Cl.
 CPC ............... B60K 23/06 (2013.01); B60L 7/26 (2013.01); B60W 10/10 (2013.01); B60W 10/18 (2013.01);
              (Continued)

(58) Field of Classification Search
 CPC ..................................................... B60K 23/06
 See application file for complete search history.

(56) References Cited

U.S. PATENT DOCUMENTS 9,862,385 B2 *  1/2018  Theel .............. B60W 30/18072
12,188,554 B2 *  1/2025  Morikawa .............. B60K 20/06
                    (Continued)

FOREIGN PATENT DOCUMENTS

JP        2000320582 A     11/2000
JP        2005226701 A      8/2005
                    (Continued)

OTHER PUBLICATIONS

Notification of Reasons for Refusal issued Aug. 12, 2025 in the JP Patent Application No. 2024-028669.

*Primary Examiner* — Michael A Berns
(74) *Attorney, Agent, or Firm* — CKC & PARTNERS CO., LLC

(57)          ABSTRACT

Provided is a control apparatus for vehicle that improves operability for a driver. A control apparatus for vehicle switches the vehicle to a freewheeling mode in which power generated by an engine is not transmitted to drive shafts. The control apparatus for vehicle includes: a motor; a battery; friction brake equipment that generates frictional braking force on the vehicle; a temperature sensor that acquires temperature of the friction brake equipment; and a determiner that assesses the temperature of the friction brake equipment acquired by the temperature sensor. The friction brake equipment generates the friction braking force when the battery is fully charged. The freewheeling mode is deactivated in a case where the temperature of the friction brake equipment exceeds a predetermined temperature while the battery is fully charged and the vehicle is in the freewheeling mode.

3 Claims, 2 Drawing Sheets

(51) Int. Cl.
　　*B60W 10/10* 　　(2012.01)
　　*B60W 10/18* 　　(2012.01)
　　*B60W 30/18* 　　(2012.01)

(52) U.S. Cl.
　　CPC .. *B60W 30/18127* (2013.01); *B60L 2240/642* (2013.01); *B60L 2250/24* (2013.01); *B60L 2260/20* (2013.01); *B60W 2510/184* (2013.01); *B60W 2530/00* (2013.01); *B60W 2552/15* (2020.02); *B60W 2710/1005* (2013.01)

(56) References Cited

U.S. PATENT DOCUMENTS

| | | | | |
|---|---|---|---|---|
| 2010/0304922 | A1* | 12/2010 | Ohkubo | B60W 30/19 477/4 |
| 2017/0183011 | A1 | 6/2017 | Theel et al. | |
| 2024/0326586 | A1* | 10/2024 | Morikawa | B60W 30/18127 |
| 2024/0328506 | A1* | 10/2024 | Morikawa | F16H 59/044 |

FOREIGN PATENT DOCUMENTS

| | | | | |
|---|---|---|---|---|
| JP | 2016164049 | A | | 9/2016 |
| JP | 2017202760 | A | | 11/2017 |
| JP | 2018083573 | A | * | 5/2018 |
| JP | 6760015 | B2 | * | 9/2020 |

* cited by examiner

CONTROL APPARATUS FOR VEHICLE

This application is based on and claims the benefit of priority from Chinese Patent Application No. CN202310336708.3, filed on 31 Mar. 2023, the content of which is incorporated herein by reference.

BACKGROUND OF THE INVENTION

Field of the Invention

The present invention relates to a control apparatus for vehicle.

Related Art

In recent years, research and development have been conducted to improve fuel efficiency, which contributes to an increase in energy efficiency, in order to ensure that more people can have access to affordable, reliable, sustainable, and advanced energy.

For example, a known vehicle is equipped with a coasting mode (also referred to as a freewheeling mode) for the purpose of improving fuel efficiency. When this coasting mode is activated, the clutch is automatically disengaged in response to a driver lifting his/her foot off the accelerator pedal, so that the engine idles, and the speed gradually decreases.

Examples of types of roads where the coasting mode is used include gentle slopes and highways. The coasting mode is effective in situations where the driver does not want to apply engine braking too much, i.e., where the driver wants to reduce the speed gradually.

For example, Japanese Unexamined Patent Application, Publication No. 2005-226701 discloses a technology in which a vehicle automatically disengages the clutch that connects the output shaft of the engine to the input shaft of the transmission to perform freewheeling when the vehicle is running at a speed faster than a predetermined speed and conditions for permitting freewheeling are met, and activates engine braking to reduce the speed of the vehicle without performing freewheeling when, for example, the vehicle is running downhill.

Patent Document 1: Japanese Unexamined Patent Application, Publication No. 2005-226701

SUMMARY OF THE INVENTION

In general, ways of braking a vehicle include regenerative braking and friction braking. A vehicle is designed to consume electric power from a battery of the vehicle in a case where the battery is fully charged so that regenerative braking can be used to supplement braking force equivalent to engine braking that occurs when the driver lifts his/her foot off the accelerator pedal.

During freewheeling, however, engine braking does not occur. Consequently, it is impossible to perform such electric power consumption, and it is impossible to perform regenerative braking. Therefore, in a case where the battery is fully charged, electric energy, which can be consumed during normal running, is instead converted entirely into heat energy in friction braking during freewheeling. As a result, the temperature of the friction material of the brakes increases, raising concerns about a potential decrease in brake performance.

Furthermore, in a case where the battery is fully charged, only limited deceleration gear stages are permitted to be selected when the driver changes deceleration gear stages during freewheeling in order to engage engine braking.

It is desired to keep this functional restriction uniform across different vehicles so that the driver can become aware of a high-temperature state of the brakes.

The present invention was achieved in consideration of the above-described circumstances, and an object thereof is to provide a control apparatus for vehicle that improves operability for a driver. Thus, the present invention aims to contribute to an increase in energy efficiency.

(1) The present invention provides a control apparatus for vehicle (for example, a control apparatus 1 for vehicle described below) for switching a vehicle to a freewheeling mode in which power generated by a power source (for example, an engine 2 described below) of the vehicle is not transmitted to a drive shaft (for example, drive shafts 7 described below) of the vehicle. The control apparatus for vehicle includes: a generator (for example, a motor 13 described below) configured to be rotated by the power from the power source to generate electric power; a battery (for example, a battery 14 described below) configured to be charged with the electric power generated by the generator; a friction brake (for example, friction brake equipment 15 described below) configured to generate frictional braking force on the vehicle; a temperature acquirer (for example, a temperature sensor 16 described below) configured to acquire temperature of the friction brake; and a determiner (for example, a determiner 9A described below) configured to assess the temperature of the friction brake acquired by the temperature acquirer. The friction brake generates the friction braking force when the battery is fully charged. The freewheeling mode is deactivated in a case where the temperature of the friction brake exceeds a predetermined temperature while the battery is fully charged and the vehicle is in the freewheeling mode.

The control apparatus for vehicle according to the invention described in (1) determines whether or not to deactivate the freewheeling mode based on the temperature of the friction brake (including brake calipers, brake fluid or brake pads), and deactivates the freewheeling mode in a case where the temperature is higher than a predetermined temperature. This configuration helps keep the uniformity with respect to the freewheeling function and the deceleration changing function, enhancing the product effectiveness and attractiveness.

(2) The control apparatus for vehicle according to the invention described in (1) preferably further includes a decelerator (for example, an ECU 9 and the motor 13 described below) having a plurality of deceleration gear stages for changing deceleration of the vehicle. Preferably, the decelerator is shifted to one of the plurality of deceleration gear stages upon the freewheeling mode being deactivated.

The control apparatus for vehicle according to the invention described in (2) can make the driver aware of an increased heat load, so that the decelerator can be shifted to a deceleration gear stage corresponding to a deceleration other than a deceleration corresponding to a deceleration gear stage used during the coasting mode. This configuration allows the driver to become aware of the heat load visually and perceptually, enhancing the product effectiveness and attractiveness.

(3) The control apparatus for vehicle according to the invention described in (1) or (2) preferably further includes: a running condition detector (for example, a running condition detector 12 described below) configured to detect a running condition of the vehicle; a decelerator (for example, an automatic transmission 4 described below) having a plurality of deceleration gear stages for changing deceleration of the vehicle; and a controller (for example, a controller 9B described below) configured to set the decelerator to a deceleration gear stage associated with the temperature of the friction brake among the plurality of deceleration gear stages. Preferably, the determiner determines whether or not the vehicle is in a downhill condition based on a result of the detection by the running condition detector, and the controller shifts the decelerator to a deceleration gear stage associated with a current temperature of the friction brake in a case where the vehicle is in the freewheeling mode and the determiner determines that the vehicle is in the downhill condition.

Engine braking does not operate while the vehicle is coasting. The decelerator is therefore shifted to a deceleration gear stage as necessary. Shifting the decelerator to the deceleration gear stage with an appropriate deceleration is varied as needed based on factors such as slope angle. The control apparatus for vehicle according to the invention described in (3) can determine whether or not the vehicle is in a downhill condition and shift the decelerator to a deceleration gear stage corresponding to an appropriate deceleration, so that the brake (friction material of the brakes) can be prevented from reaching excessively high temperatures.

(4) The control apparatus for vehicle according to the invention described in any one of (1) to (3) preferably further includes: a decelerator (for example, an automatic transmission 4 described below) having a plurality of deceleration gear stages for changing deceleration of the vehicle; and a manipulator (for example, a manipulator 10 described below) provided on steering (for example, steering 11 described below) of the vehicle and configured to allow selection of the freewheeling mode in accordance with an operation performed by a driver. This control apparatus for vehicle preferably has a fixed shift mode that allows shift between the plurality of deceleration gear stages based on an operation performed by a driver and an automatic shift mode that allows shift between the plurality of deceleration gear stages based on a running condition of the vehicle.
Preferably, the decelerator is shifted to a deceleration gear stage corresponding to a higher deceleration than a deceleration corresponding to a currently selected deceleration gear stage through an operation of the manipulator, switching from the automatic shift mode to the fixed shift mode is executed in a case where the temperature of the friction brake exceeds the predetermined temperature while the control apparatus is in the automatic shift mode and the vehicle is in the freewheeling mode, and the vehicle is prevented from switching to the freewheeling mode in a case where the temperature of the friction brake exceeds the predetermined temperature while the control apparatus is in the fixed shift mode.

The control apparatus for vehicle according to the invention described in (4) can limit the shift mode to the fixed shift mode that allows the operation performed by the driver and prevents the vehicle from switching to the freewheeling mode in a case where the temperature of the friction brake is higher than a predetermined temperature so as to direct the driver's attention to deceleration. This configuration promotes safety awareness, enhancing the product effectiveness and attractiveness.

The present invention makes it possible to improve operability for a driver. Thus, the present invention can contribute to an increase in energy efficiency.

DETAILED DESCRIPTION OF THE INVENTION

The following describes an embodiment of the present invention in detail with reference to the accompanying drawings.

Figure 1:
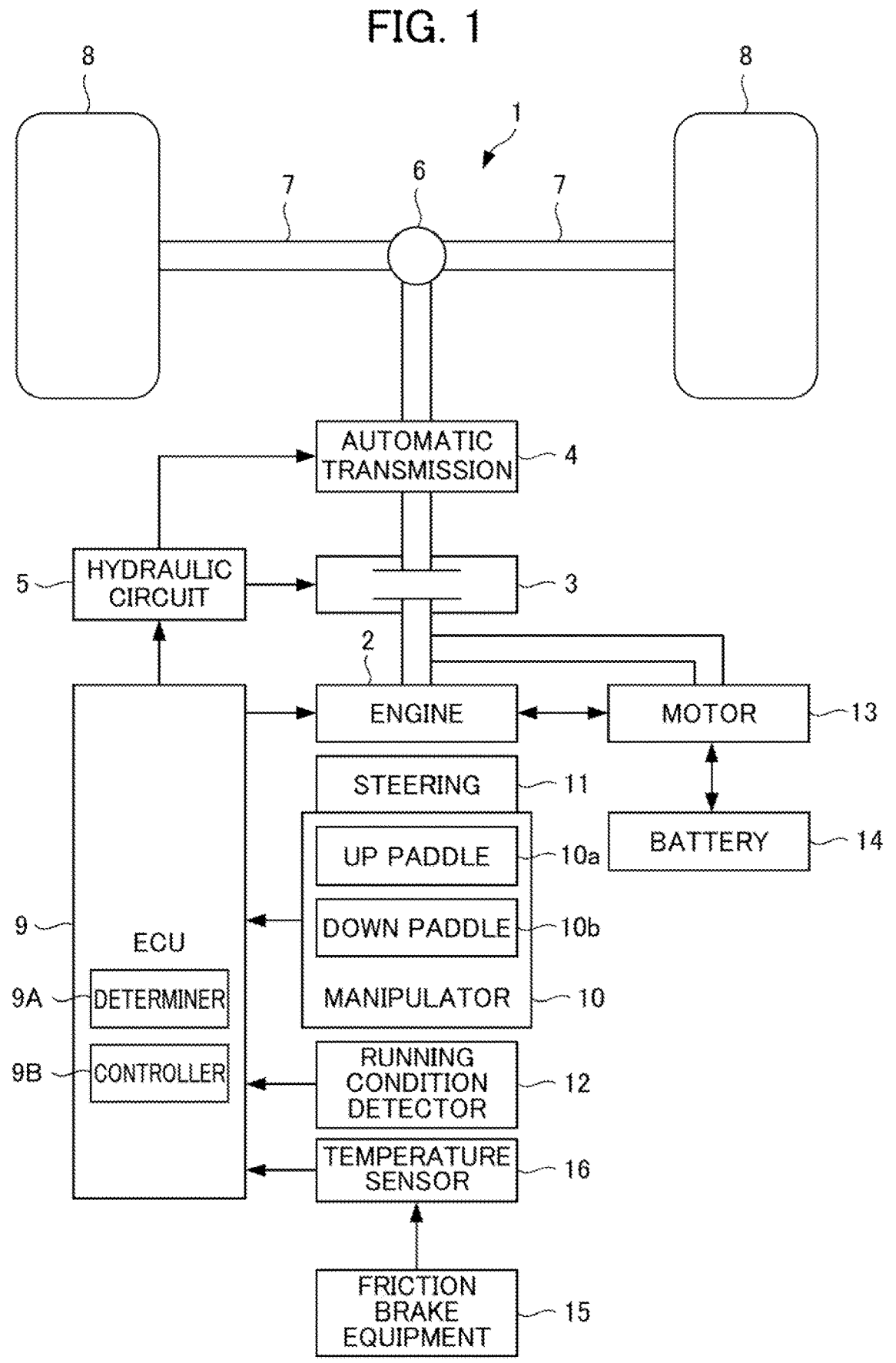
FIG. 1 is a schematic diagram illustrating a configuration of a control apparatus for vehicle according to an embodiment of the present invention.

First, a configuration of a control apparatus 1 for vehicle according to an embodiment of the present invention will be described with reference to FIG. 1. FIG. 1 is a schematic diagram illustrating the configuration of the control apparatus 1 for vehicle according to the embodiment of the present invention.

The control apparatus 1 for vehicle shown in FIG. 1 can switch the vehicle from a D range, which is a running mode to be used for normal running, to a freewheeling mode, in which power generated by an engine 2 is not transmitted to a pair of left and right drive shafts 7. The control apparatus 1 for vehicle has a fixed shift mode that allows shift between a plurality of deceleration gear stages based on a driver's operation and an automatic shift mode that allows shift between the plurality of deceleration gear stages based on a running condition of the vehicle.

Specifically, the control apparatus 1 for vehicle includes, for example, the engine (power source) 2, a clutch 3, an automatic transmission (decelerator) 4, a hydraulic circuit 5, a differential mechanism 6, the pair of left and right drive shafts 7, a pair of left and right drive wheels 8, an electric control unit (ECU) 9, a manipulator (shifter or paddle shifter) 10 including an UP paddle 10a and a DOWN paddle 10b, steering 11, a running condition detector 12, a motor 13, a battery 14, friction brake equipment 15, and a temperature sensor 16.

The engine 2 is a power source that generates power for driving the vehicle. The present embodiment adopts a hybrid engine that combines the motor 13 and the engine 2, but is not limited as such. The power generated by the hybrid engine is transmitted through the clutch 3, the automatic transmission 4, and the differential mechanism 6 to the pair of left and right drive shafts 7 having the pair of left and right drive wheels 8 attached thereto.

The clutch 3 disconnects a transmission path for transmitting the power generated by the hybrid engine to the pair of left and right drive shafts 7 according to the pressure (hydraulic pressure) generated by hydraulic oil supplied from the hydraulic circuit 5. The clutch 3 disconnects the transmission path for transmitting the power generated by the hybrid engine to the pair of left and right drive shafts 7 when the vehicle has been switched to the freewheeling mode.

The automatic transmission 4 adjusts the gear ratio according to the pressure (hydraulic pressure) generated by the hydraulic oil supplied from the hydraulic circuit 5.

The hydraulic circuit 5 supplies the pressure (hydraulic pressure) generated by the hydraulic oil to the clutch 3 and the automatic transmission 4 based on control by the ECU 9.

The differential mechanism 6 distributes the power generated by the hybrid engine and transmitted through the clutch 3 and the automatic transmission 4 to the pair of left and right drive shafts 7. The pair of left and right drive wheels 8 are respectively attached to the pair of left and right drive shafts 7. The pair of left and right drive wheels 8 convert the power transmitted through the pair of left and right drive shafts 7 into propelling force for the vehicle.

The ECU 9 controls, for example, the engine 2, the motor 13, the battery 14, and the hydraulic circuit 5 based on inputs from the manipulator 10, the running condition detector 12, and the temperature sensor 16. The ECU 9 reads and executes a computer program stored in memory (not shown) to perform various processes. Specifically, the ECU 9 includes a determiner 9A and a controller 9B.

The ECU 9 and the motor 13 form the decelerator of the present embodiment. The decelerator of the present embodiment has a plurality of deceleration gear stages for changing the deceleration of the vehicle. The plurality of deceleration gear stages include a first deceleration gear stage corresponding to a higher deceleration than a deceleration corresponding to a deceleration gear stage to be selected when the vehicle runs in the freewheeling mode.

The motor 13 generates driving force when the driver accelerates the vehicle by pressing on an accelerator operator (accelerator pedal). On the other hand, when the driver decelerates the vehicle by lifting his/her foot off the accelerator operator, opposite force acts and the motor 13 functions as a generator. The force required for this electric power generation serves as resistance to the rotation of the drive wheels 8 and functions as regenerative braking. The decelerator of the present embodiment is enabled to change the intensity of the regenerative braking in stages by controlling the rotation of the motor 13 using the ECU 9. Specifically, the decelerator of the present embodiment can change the deceleration of the vehicle in stages in accordance with the driver's operation of the UP paddle 10a and the DOWN paddle 10b, which is referred to as a deceleration selector described below.

The determiner 9A of the ECU 9 assesses the temperature of the friction brake equipment 15 acquired by the temperature sensor 16. That is, the determiner 9A determines whether or not the temperature of the friction brake equipment 15 acquired by the temperature sensor 16 is high. The determiner 9A determines whether the vehicle is in a downhill condition or in another running condition based on the result of the detection by the running condition detector 12.

The controller 9B of the ECU 9 controls operation of the vehicle by setting the decelerator to a deceleration gear stage. The controller 9B sets the decelerator to a deceleration gear stage associated with the temperature of the friction brake equipment 15 among the plurality of deceleration gear stages. The controller 9B shifts the decelerator to a deceleration gear stage associated with the current temperature of the friction brake equipment 15 in a case where the vehicle is in the freewheeling mode and the determiner 9A determines that the vehicle is in the downhill condition. This configuration makes it possible to protect the friction brakes and ensure that minimal or no deterioration due to the temperature of the friction brake equipment 15 is found in the product effectiveness and attractiveness of the friction brakes when the vehicle completes a downhill run. In this configuration, the deceleration gear stages may be further associated with running environments (for example, the presence or absence of a curve or a gradient) and stored.

The controller 9B also deactivates the freewheeling mode in a case where the temperature of the friction brake equipment 15 exceeds a predetermined temperature while the battery 14 is fully charged and the vehicle is in the freewheeling mode.

This predetermined temperature is set in consideration of the fact that a conventional deceleration selector performs restriction control to limit selectable gear stages by restricting one or more higher brake load gear stages so that the running mode returns to the D range in a case where the estimated temperature of the friction brake equipment has reached a predetermined high temperature (fourth temperature described below). More specifically, selectable gear stages in the conventional deceleration selector are limited to the first to fifth deceleration gear stages in a case where the aforementioned predetermined temperature is reached, to the first to fourth deceleration gear stages in a case where a first temperature higher than the aforementioned predetermined temperature is reached, to the first to third deceleration gear stages in a case where a second temperature higher than the first temperature is reached, to the first and second deceleration gear stages in a case where a third temperature higher than the second temperature is reached, and to only the first deceleration gear stage in a case where a fourth temperature higher than the third temperature is reached.

The controller 9B shifts the decelerator to one of the plurality of deceleration gear stages upon deactivating the freewheeling mode. Specifically, the controller 9B may shift the decelerator to a deceleration gear stage corresponding to a higher deceleration in the automatic shift mode, or may prompt the driver to shift the decelerator to a deceleration gear stage corresponding to a higher deceleration in a driver selectable mode (fixed shift mode) activated after the deactivation of the freewheeling mode.

The controller 9B executes switching from the automatic shift mode to the fixed shift mode in a case where the temperature of the friction brake equipment 15 exceeds the predetermined temperature while the control apparatus 1 is in the automatic shift mode and the vehicle is in the freewheeling mode. The controller 9B also prevents the vehicle from switching to the freewheeling mode in a case where the temperature of the friction brake equipment 15 exceeds the predetermined temperature while the control apparatus 1 is in the fixed shift mode.

The manipulator 10 is provided on the steering 11 and allows selection of the freewheeling mode in accordance with the driver's operation. The vehicle transitions to the freewheeling mode upon the freewheeling mode being selected through an operation of the manipulator 10.

The manipulator 10 is a shifter configured to change deceleration gear stages. The manipulator 10, or the shifter, includes the UP paddle (first manipulator) 10a and the DOWN paddle (second manipulator) 10b. The UP paddle 10a is enabled to cause a shift to a deceleration gear stage corresponding to a lower deceleration than a deceleration corresponding to the currently selected deceleration gear stage. The DOWN paddle 10b is enabled to cause a shift to a deceleration gear stage corresponding to a higher deceleration than the deceleration corresponding to the currently selected deceleration gear stage. The vehicle transitions to the freewheeling mode through an operation of the UP paddle 10a.

The manipulator 10, or the shifter, is a paddle shifter. Keeping the UP paddle 10a in an operated state for a first predetermined period of time causes a transition to the automatic shift mode and the freewheeling mode. Keeping the UP paddle 10a in the operated state for a second predetermined period of time, which is longer than the first predetermined period of time, causes a transition to the fixed shift mode and the freewheeling mode.

The freewheeling mode is deactivated through an operation of the DOWN paddle 10b.

Keeping the DOWN paddle 10b in an operated state for the first predetermined period of time when the vehicle is in the freewheeling mode causes a shift to the first deceleration gear stage.

Keeping either the UP paddle 10a or the DOWN paddle 10b in the operated state for the second predetermined period of time, which is longer than the first predetermined period of time, when the vehicle is running in the first deceleration gear stage causes switching between the fixed shift mode and the automatic shift mode.

The running condition detector 12 detects a running condition of the vehicle. The running condition detector 12 inputs a detection signal indicating the detected running condition of the vehicle to the ECU 9.

The motor 13 is rotated by the power from the engine 2 to generate electric power. The motor 13 also serves as a power source that generates power for driving the vehicle using electric power from the battery 14.

The battery 14 charges with the electric power generated by the motor 13.

The friction brake equipment 15 generates frictional braking force on the vehicle. When the battery 14 is fully charged, the friction brake equipment 15 generates frictional braking force equivalent to braking force of regenerative braking/engine braking that occurs while the driver is not pressing on the brake pedal.

The temperature sensor 16 acquires the temperature of the friction brake equipment 15. The temperature sensor 16 inputs a signal indicating the acquired temperature of the friction brake equipment 15 to the ECU 9.

Figure 2:
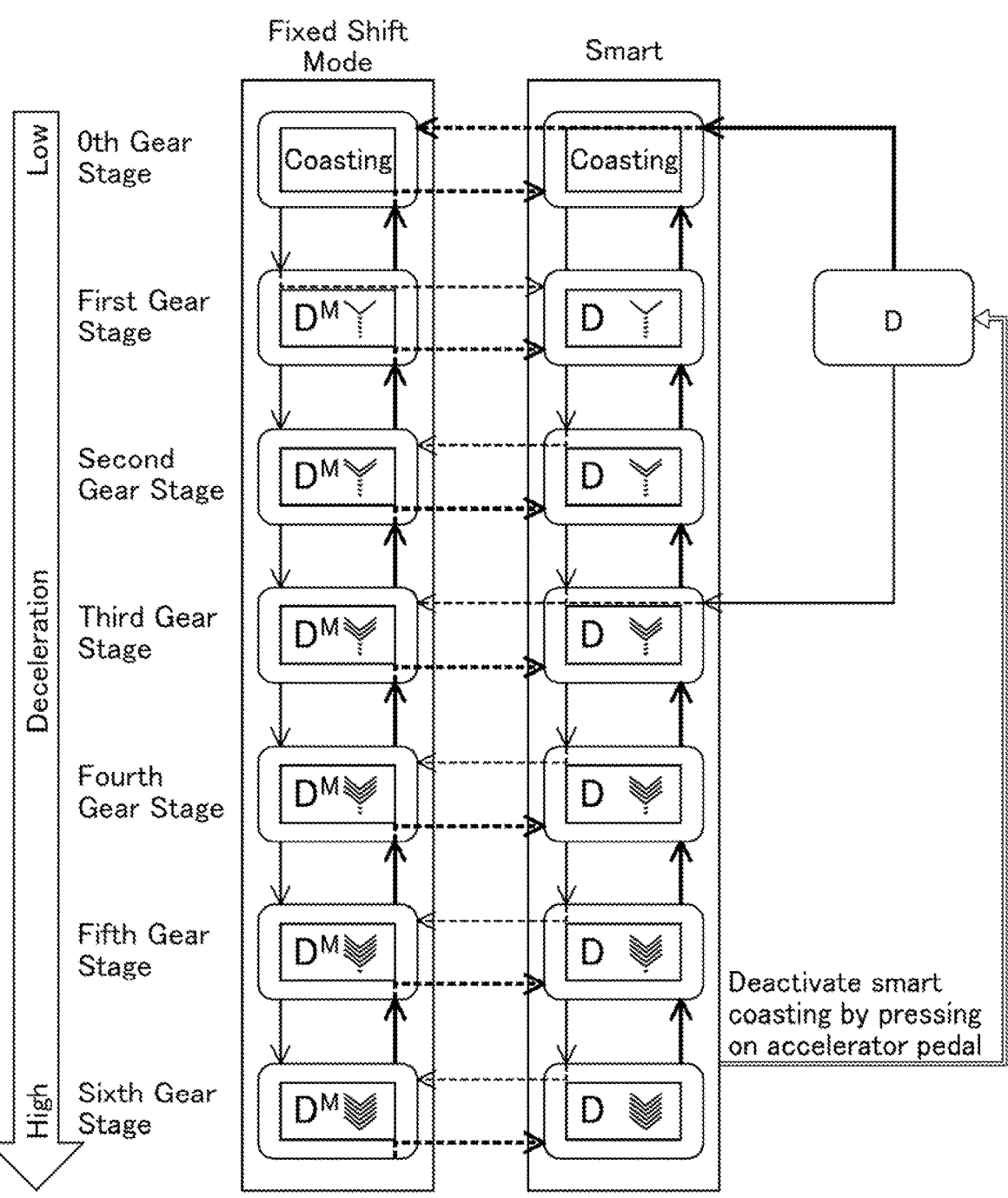
FIG. 2 is a schematic diagram for explaining transitions between a plurality of deceleration gear stages.

Next, the plurality of deceleration gear stages and transitions therebetween in the decelerator of the present embodiment will be described with reference to FIG. 2. FIG. 2 is a schematic diagram for explaining transitions between the plurality of deceleration gear stages.

As shown in FIG. 2, the plurality of deceleration gear stages include a 0th deceleration gear stage, which is selected when the vehicle runs in the freewheeling mode (coasting mode), a first deceleration gear stage, which is selected when the vehicle runs in the freewheeling mode and corresponds to a higher deceleration than a deceleration corresponding to the 0th deceleration gear stage, a second deceleration gear stage, which corresponds to a higher deceleration than the deceleration corresponding to the first deceleration gear stage, a third deceleration gear stage, which corresponds to a higher deceleration than the deceleration corresponding to the second deceleration gear stage, a fourth deceleration gear stage, which corresponds to a higher deceleration than the deceleration corresponding to the third deceleration gear stage, a fifth deceleration gear stage, which corresponds to a higher deceleration than the deceleration corresponding to the fourth deceleration gear stage, and a sixth deceleration gear stage, which corresponds to a higher deceleration than the deceleration corresponding to the fifth deceleration gear stage.

"UP paddle pulling", which means keeping the UP paddle 10a in the operated state for the first predetermined period of time, performed when the running mode is "D range", which is used for normal running, activates smart coasting, and causes a transition to the automatic shift mode and the freewheeling mode (coasting mode), which in other words is a shift to the 0th gear stage in the automatic shift mode.

The smart coasting is intended to be used, for example, in situations where the distance to a distant target is being adjusted. Specific examples of such situations include a situation where the driver wants to decelerate the vehicle gently to adjust the following distance to a vehicle ahead because there is an adequate distance between the vehicles, and a situation where the driver wants to decelerate the vehicle gently to adjust the vehicle speed and the distance to an intersection because there is an adequate distance between the vehicle and the intersection. In these situations, the UP paddle 10a is used to ease off the deceleration force for a gentle deceleration, and the running mode automatically returns to the D range when the driver re-accelerates the vehicle, as described below.

"UP paddle long pulling", which means keeping the UP paddle 10a in the operated state for the second predetermined period of time longer than the first predetermined period of time, performed when the running mode is "D range" activates fixed-shift-mode coasting, and causes a transition to the fixed shift mode and the freewheeling mode (coasting mode), which in other words is a shift to the 0th gear stage in the fixed shift mode.

The fixed-shift-mode coasting is intended to be used in situations where the driver wants to increase the range of deceleration control with the use of the accelerator operator to improve acceleration controllability. Examples of such situations include a situation where the vehicle is following a vehicle ahead with a narrow following distance due to traffic congestion and the driver wants to decelerate the vehicle gently to adjust the following distance, and a situation where the driver wants to effortlessly drive the vehicle downhill on a slope where the vehicle is expected to run at a constant speed or accelerate, without the vehicle accelerating or decelerating due to the gradient of the slope.

"Down paddle pulling", which means keeping the DOWN paddle 10b in the operated state for the first predetermined period of time, performed when the running mode is "smart coasting" deactivates the freewheeling mode and causes a shift to the second deceleration gear stage in the automatic shift mode.

"DOWN paddle long pulling", which means keeping the DOWN paddle 10b in the operated state for the second predetermined period of time, performed when the running mode is "smart coasting" deactivates the freewheeling mode, and causes a transition from the automatic shift mode to the fixed shift mode, which in other words is a shift to the second gear stage in the fixed shift mode.

Upon an accelerator operation detector detecting a driver's operation of the accelerator operator when the running mode is "smart coasting", the freewheeling mode is deactivated and the running mode transitions to "D range".

"Down paddle pulling", which means keeping the DOWN paddle 10b in the operated state for the first predetermined period of time, performed when the running mode is "fixed-shift-mode coasting" deactivates the freewheeling mode and causes a shift to the first gear stage in the fixed shift mode.

"DOWN paddle long pulling", which means keeping the DOWN paddle 10b in the operated state for the second predetermined period of time, performed when the running mode is "fixed-shift-mode coasting" deactivates the freewheeling mode, and causes a transition from the fixed shift mode to the automatic shift mode, which in other words is a shift to the first gear stage in the automatic shift mode.

The control apparatus 1 for vehicle activates the coasting mode and the deceleration gear stages as a single function, and restricts one or more deceleration gear stages to exit from the coasting mode. Specifically, in this coasting restriction, the control apparatus 1 for vehicle restricts deceleration gear stages in the order of the sixth deceleration gear stage corresponding to the highest deceleration, the fifth deceleration gear stage corresponding to the next highest deceleration . . . . This configuration helps improve operability for the driver.

The control apparatus 1 for vehicle determines whether or not to deactivate the freewheeling mode based on the temperature of the friction brake equipment (including brake calipers, brake fluid or brake pads) 15, and deactivates the freewheeling mode in a case where the temperature is higher than a predetermined temperature. This configuration helps keep the uniformity with respect to the freewheeling function and the deceleration changing function, enhancing the product effectiveness and attractiveness.

The control apparatus 1 for vehicle can make the driver aware of an increased heat load, so that the decelerator can be shifted to a deceleration gear stage corresponding to a deceleration other than a deceleration corresponding to a deceleration gear stage used during the coasting mode. This configuration allows the driver to become aware of the heat load visually and perceptually, enhancing the product effectiveness and attractiveness.

Engine braking does not operate while the vehicle is coasting. The decelerator is therefore shifted to a deceleration gear stage as necessary. Shifting the decelerator to the deceleration gear stage with an appropriate deceleration is varied as needed based on factors such as slope angle. The control apparatus 1 for vehicle can determine whether or not the vehicle is in a downhill condition and shift the decelerator to a deceleration gear stage corresponding to an appropriate deceleration, so that the brake equipment (friction material of the brakes) 15 can be prevented from reaching excessively high temperatures.

The control apparatus 1 for vehicle can limit the shift mode to the fixed shift mode that allows the driver's operation and prevent the vehicle from switching to the freewheeling mode in a case where the temperature of the friction brake equipment 15 is higher than a predetermined temperature so as to direct the driver's attention to deceleration. This configuration promotes safety awareness, enhancing the product effectiveness and attractiveness.

It should be noted that the present invention is not limited to the embodiment described above, and encompasses changes such as modifications and improvements to the extent that the object of the present invention is achieved.

EXPLANATION OF REFERENCE NUMERALS

1: Control apparatus for vehicle
2: Engine (power source)
3: Clutch
4: Automatic transmission
5: Hydraulic circuit
6: Differential mechanism
7: Drive shaft
8: Drive wheel
9: ECU (decelerator)
9A: Determiner
9B: Controller
10: Manipulator (shifter or paddle shifter)
10a: UP paddle (first manipulator)
10b: DOWN paddle (second manipulator)
11: Steering
12: Running condition detector
13: Motor (generator, decelerator)
14: Battery 15: Friction brake equipment (friction brake)
16: Temperature sensor (temperature acquirer)

What is claimed is:

1. A control apparatus for vehicle for switching a vehicle to a freewheeling mode in which power generated by a power source of the vehicle is not transmitted to a drive shaft of the vehicle, the control apparatus comprising:
   a generator configured to be rotated by the power from the power source to generate electric power;
   a battery configured to be charged with the electric power generated by the generator;
   a friction brake configured to generate frictional braking force on the vehicle;
   a temperature sensor configured to acquire temperature of the friction brake; and
   a determiner comprising a processor configured to assess the temperature of the friction brake acquired by the temperature sensor, wherein
   the friction brake generates the friction braking force when the battery is fully charged, and
   the freewheeling mode is deactivated and the po ed by the power source is transmitted to the drive shaft in a case where the temperature of the friction brake exceeds a predetermined temperature while the battery is fully charged and the vehicle is in the freewheeling mode.

2. The control apparatus for vehicle according to claim 1, further comprising
   an automatic transmission having a plurality of deceleration gear stages for changing deceleration of the vehicle, wherein
   the automatic transmission is shifted to one of the plurality of deceleration gear stages upon the freewheeling mode being deactivated.

3. The control apparatus for vehicle according to claim 1, further comprising:
   an automatic transmission having a plurality of deceleration gear stages for changing deceleration of the vehicle; and
   a manipulator provided on steering of the vehicle and configured to allow selection of the freewheeling mode in accordance with an operation performed by a driver,
   the control apparatus for vehicle having
   a fixed shift mode that allows shift between the plurality of deceleration gear stages based on an operation performed by the driver and
   an automatic shift mode that allows shift between the plurality of deceleration gear stages based on a running condition of the vehicle, wherein
   the automatic transmission is shifted to a deceleration gear stage corresponding to a higher deceleration than a deceleration corresponding to a currently selected deceleration gear stage through an operation of the manipulator,
   switching from the automatic shift mode to the fixed shift mode is executed in a case where the temperature of the friction brake exceeds the predetermined temperature while the control apparatus is in the automatic shift mode and the vehicle is in the freewheeling mode, and
   the vehicle is prevented from switching to the freewheeling mode in a case where the temperature of the friction brake exceeds the predetermined temperature while the control apparatus is in the fixed shift mode.

* * * * *